United States Patent [19]
Smith et al.

[11] Patent Number: 6,116,697
[45] Date of Patent: Sep. 12, 2000

[54] ARTICULATED WORK MACHINE HAVING AN ENGINE MOUNTED IN FRONT OF A LOAD CARRYING RECEPTACLE ON A TRAILER

[75] Inventors: Jerry F. Smith, Clinton, Ill.; Alan D. Young, Tyne Wear, United Kingdom

[73] Assignee: Caterpillar Inc., Peoria, Ill.

[21] Appl. No.: 08/989,297

[22] Filed: Dec. 11, 1997

[51] Int. Cl.$^7$ ........................................ B60P 1/64
[52] U.S. Cl. ................................. 298/22 R; 298/22 AE
[58] Field of Search ........................... 298/22 R, 22 AE; 180/14.2, 14.3, 14.4

[56] References Cited

U.S. PATENT DOCUMENTS

| | | | |
|---|---|---|---|
| 2,034,674 | 3/1936 | Edwards | 180/14.4 |
| 3,454,123 | 7/1969 | Lewis | 180/14.4 X |
| 3,804,191 | 4/1974 | Golan et al. | 180/14.3 X |
| 3,913,697 | 10/1975 | Greene . | |
| 3,966,255 | 6/1976 | Licari . | |
| 4,072,203 | 2/1978 | Pierson . | |
| 4,082,157 | 4/1978 | Sternberg . | |
| 4,364,438 | 12/1982 | Pyle . | |
| 4,475,612 | 10/1984 | Anderson . | |
| 4,650,018 | 3/1987 | Silverman, Sr. . | |
| 4,947,956 | 8/1990 | Henline . | |
| 5,040,849 | 8/1991 | Thomas et al. | 298/22 R |
| 5,222,574 | 6/1993 | Miller | 180/14.4 X |

*Primary Examiner*—Stephen T. Gordon
*Attorney, Agent, or Firm*—Maginot & Addison

[57] ABSTRACT

An articulated work machine includes an engine mounted in front of a load carrying receptacle on a trailer. The articulated work machine includes a cab assembly which has a front axle assembly on which number of front wheels are mounted, and a seat for supporting an operator of the work machine. The articulated work machine further includes a trailer assembly having a rear axle assembly on which a number of rear wheels are mounted. The articulated work machine still further includes a receptacle adapted to receive and carry loads. The receptacle is supported on the trailer assembly. The articulated work machine yet further includes a coupling which pivotally connects the cab assembly to the trailer assembly. The articulated work machine still further includes an engine assembly for propelling the work machine. The engine assembly is mounted on the trailer assembly. The assembly is interposed between the receptacle and the number of front wheels.

15 Claims, 2 Drawing Sheets

ARTICULATED WORK MACHINE HAVING
AN ENGINE MOUNTED IN FRONT OF A
LOAD CARRYING RECEPTACLE ON A
TRAILER

TECHNICAL FIELD OF THE INVENTION

The present invention relates generally to an articulated work machine and more specifically to an articulated work machine having an engine mounted in front of a load carrying receptacle on a trailer.

BACKGROUND OF THE INVENTION

Many construction and mining operations require off road work machines to haul loads between various locations. One type of work machine that has excellent off road performance is an articulated work machine. The articulated work machine has a front chassis and a rear chassis which are coupled at a hitch. Generally, a cab is mounted on the front chassis and a load carrying receptacle is mounted on the rear chassis. The articulated work machine has an articulated steering mechanism whereby a pair of hydraulic cylinders steer the work machine. In particular, when the left cylinder is extended, the front chassis rotates about the hitch to the right whereas when the right cylinder is extended, the front chassis rotates about the hitch to the left. Articulated work machines generally have an engine mounted on the front chassis that drives a front axle. In addition, a drive shaft and differential cross the hitch to drive one or more rear axles giving the articulated work machine all wheel drive.

Articulated work machines have several advantages over conventional trucks. The articulated steering mechanism gives the articulated work machine a smaller turning radius than a comparatively sized conventional truck. Moreover, the articulated steering mechanism coupled to the all wheel drive gives the articulated work machine enhanced off road performance allowing the articulated work machine to operate on soft ground in conditions where a conventional truck may become bogged down. Thus, the articulated work machine can haul loads in conditions where a conventional truck may become bogged down.

Despite the advantages of the articulated work machine, articulated work machines that have heretofore been designed have several drawbacks. One drawback is that many articulated work machines mount the engine and drivetrain on the front chassis. Mounting the engine on the front chassis causes most of the engine weight be supported by the front axle. This problem is exacerbated in some articulated work machines that mount the engine a substantial distance ahead of the front axle. When such articulated work machines are empty, the engine weight supported by the front axle exceeds the weight of the empty receptacle supported by the rear axle or axles. Certain countries place limits on the maximum axle weight of work machines that are permitted to operate on the roads. Thus, it may be desirable to redistribute the weight of the engine among the axles so that one or two of the axles do not support a substantially disproportionate amount of the weight.

Another drawback associated with mounting the engine on the front chassis of the articulated work machine is that the extended length of the front cab restricts maneuverability of the work machine. Furthermore, the front mounted engine may reduce visibility out of the front of the cab.

Another drawback associated with mounting the engine on the front chassis is that the heat, noise, and vibrations generated by the engine can cause discomfort to the operator. This is especially true in configuration of the articulated work machine where the cab is not air conditioned.

Another drawback associated with mounting the engine on the front chassis is that there is a large number and type of items that must cross the hitch. For configurations with double rear axles, the drive shaft must be large enough to transfer adequate torque to both of the rear axles. Also, hydraulic power must be supplied from an oil pump, generally located near the engine, from the cab assembly to the trailer assembly to a pair of lift cylinders located on the trailer chassis. The lift cylinders are used to raise and lower the load carrying receptacle.

What is needed therefore is an apparatus and method for powering an articulated work machine which overcomes one or more of the above-mentioned drawbacks.

DISCLOSURE OF THE INVENTION

In accordance with a first embodiment of the present invention, there is provided an articulated work machine. The articulated work machine includes a cab assembly which has a front axle assembly on which a number of front wheels are mounted, and a seat for supporting an operator of the work machine. The articulated work machine further includes a trailer assembly having a rear axle assembly on which a number of rear wheels are mounted. The articulated work machine still further includes a receptacle adapted to receive and carry loads. The receptacle is supported on the trailer assembly. The articulated work machine yet further includes a coupling which pivotally connects the cab assembly to the trailer assembly. The articulated work machine still further includes an engine assembly for propelling the work machine. The engine assembly is mounted on the trailer assembly. The engine assembly is interposed between the receptacle and the number of front wheels.

In accordance with a second embodiment of the present invention, there is provided an articulated work machine. The articulated work machine includes a cab assembly which has a front axle assembly on which a number of front wheels are mounted, and a seat for supporting an operator of the work machine. The articulated work machine further includes a trailer assembly having a rear axle assembly on which a number of rear wheels are mounted. The articulated work machine still further includes a coupling which pivotally connects the cab assembly to the trailer assembly. The articulated work machine yet further includes an engine assembly for propelling the work machine. The engine assembly is mounted on the trailer assembly. The engine assembly is interposed between the number of front wheels and the number of rear wheels.

In accordance with a third embodiment of the present invention, there is provided an articulated work machine. The articulated work machine includes a cab assembly which has a front axle assembly on which a number of front wheels are mounted, and a seat for supporting an operator of the work machine. The articulated work machine further includes a trailer assembly having a first rear axle assembly on which a number of first rear wheels are mounted, and a second rear axle assembly on which a number of second rear wheels are mounted. The articulated work machine still further includes a receptacle adapted to receive and carry loads. The receptacle is supported on the trailer assembly. The articulated work machine yet further includes a coupling which pivotally connects the cab assembly to the trailer assembly. The articulated work machine still further includes an engine assembly for propelling the work machine. The engine assembly is mounted on the trailer assembly. The engine assembly is interposed between the receptacle and the number of front wheels. The engine assembly is further interposed between the number of front wheels and the number of second rear wheels.

BEST MODE FOR CARRYING OUT THE INVENTION

Figure 1:
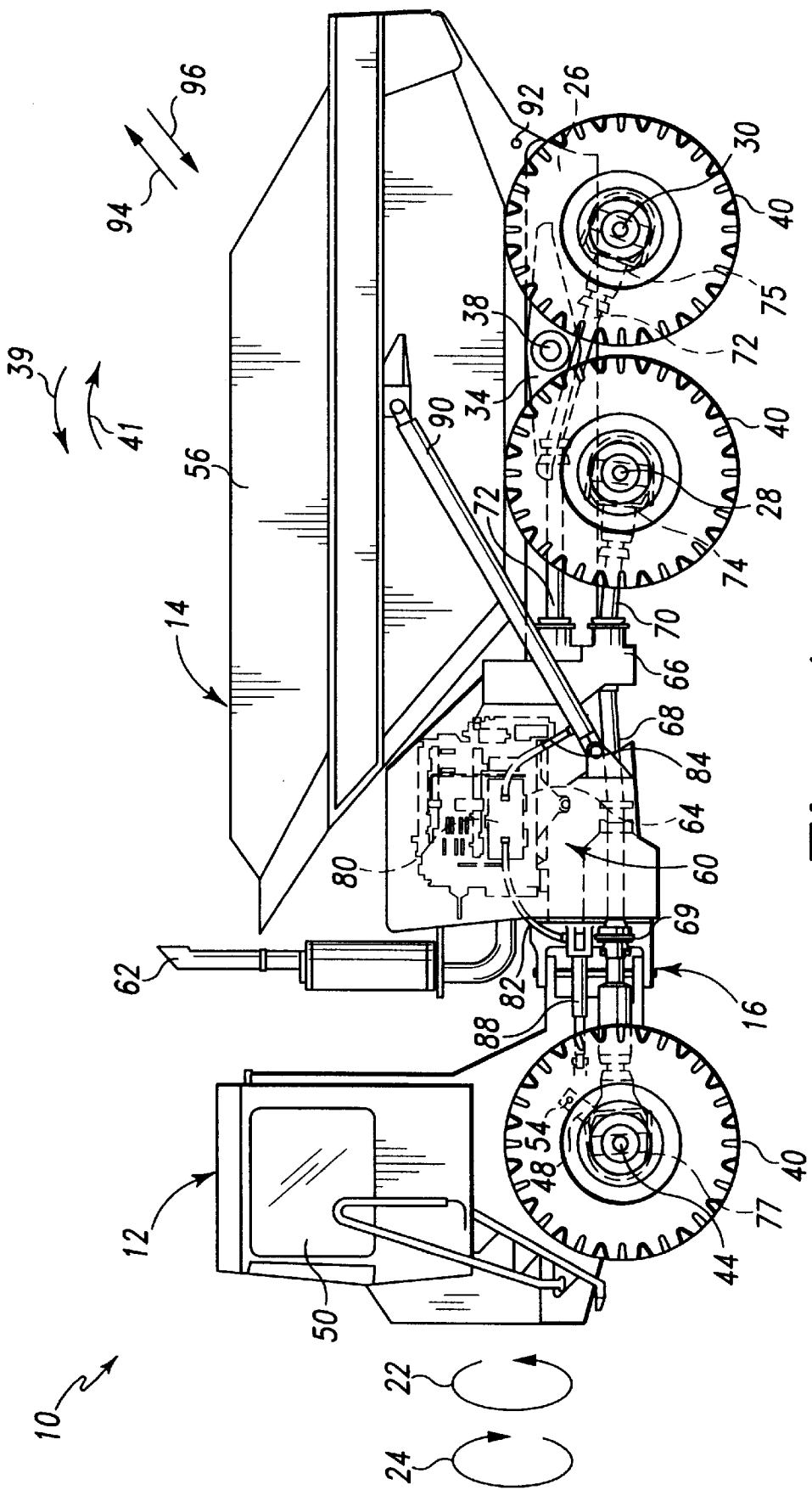
FIG. 1 is a side view of the articulated work machine 10 which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
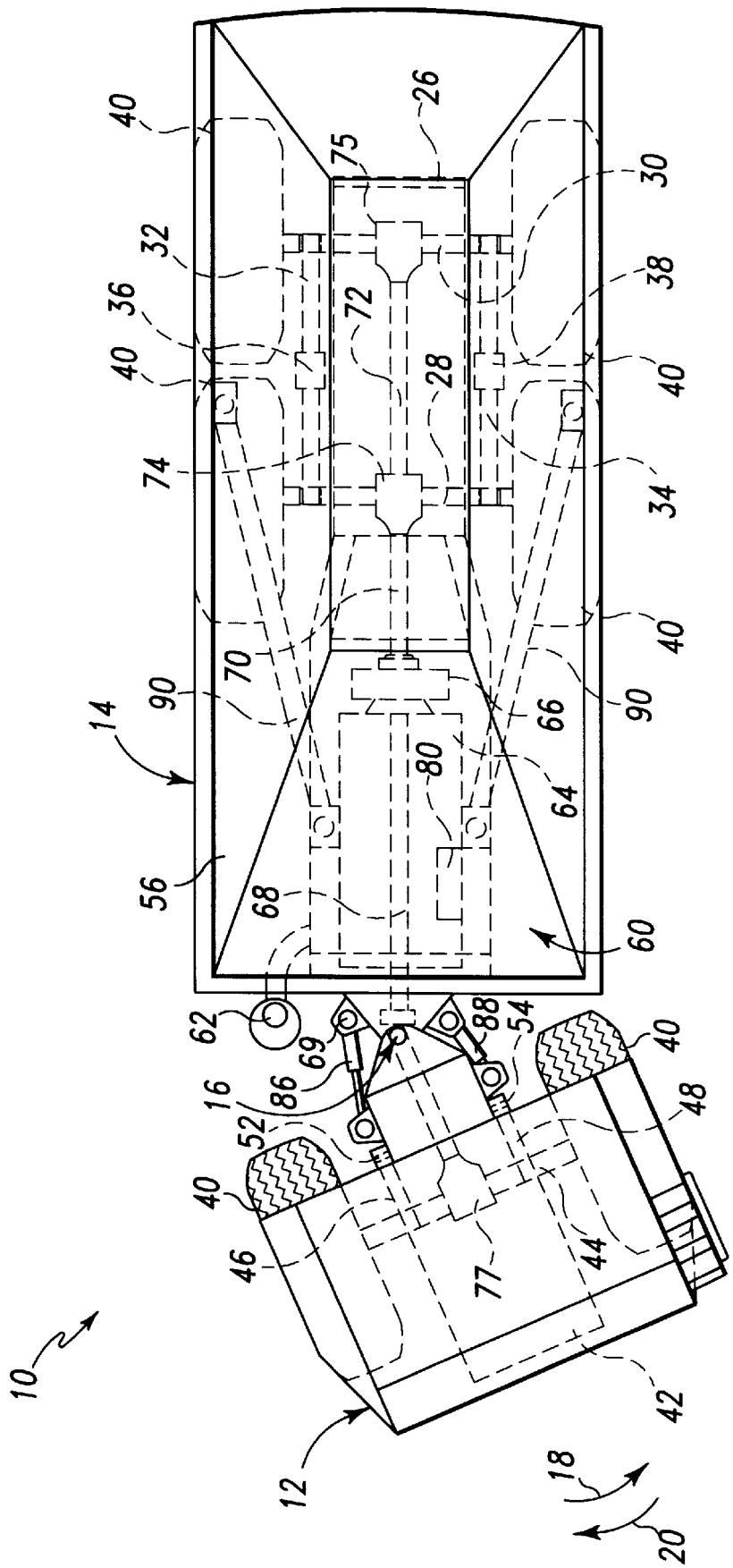
FIG. 2 is a top view of the articulated work machine 10 of FIG. 1, however, in this figure, the cab assembly is rotated in relation to the trailer assembly.

Referring now to FIGS. 1 and 2 there is shown an articulated work machine 10 that incorporates the features of the present invention therein. The articulated work machine 10 includes a cab assembly 12 and a trailer assembly 14. The cab assembly 12 is pivotably coupled to the trailer assembly 14 by a coupler or hitch 16 which allows the cab assembly 12 to rotate about the hitch 16 in the general directions of arrows 18 and 20 of FIG. 2. Note that in FIG. 2, the cab assembly 12 of the articulated work machine 10 is shown rotated about the hitch 16 in the general direction of arrow 18. The hitch 16 includes a collar (not shown) that allows the cab assembly 12 to oscillate or twist relative to the trailer assembly 14 in the general direction of arrows 22 and 24 shown in FIG. 1. Thus, the collar allows the cab assembly 12 and the trailer assembly 14 to adjust to various types of terrain.

The cab assembly 12 includes a cab chassis 42, a front axle 44, a right front suspension member 46, a left front suspension member 48, and a cab 50. The cab chassis 42 is a frame that spans the length of the cab assembly 12 and provides a structure for mounting other components of the cab assembly 12 thereon. The cab 50 is located above the cab chassis 42 and provides the operator with a seat and controls to operate the articulated work machine 10. Alternately, the seat may include an area which allows the operator to stand while operating the articulated work machine 10. The cab 50 is provided at a vertical height which is sufficient to provide the operator with excellent vision of the front and sides of the articulated work machine 10.

The left front suspension member 48 shown in FIG. 2 is pivotably mounted to the cab chassis 42 by a pin 54 such that the left front suspension member 48 can rotate about the pin 54 in the general direction of arrows 39 and 41 as shown in FIG. 1. In a similar manner, the right front suspension member 46 shown in FIG. 2 is pivotably mounted to the cab chassis 42 by a pin 52 such that the right front suspension member 46 can rotate about the pin 52 in the general directions of arrows 39 and 41 shown in FIG. 1. One end of front axle 44 is operatively coupled to the right front suspension member 46. Whereas, the other end of front axle 44 is operatively coupled to the left front suspension member 48. Both the front right suspension member 46, and the front left suspension member 48 are coupled to a respective hydraulic cylinder (not shown). Both of the hydraulic cylinders are further connected to a nitrogen accumulator (not shown) which provides a damping force for the right front suspension member 46 and the left front suspension member 48 during operation of the articulated work machine 10. A large all terrain wheel 40 is mounted on each end of the front axle 44.

The trailer assembly 14 includes a trailer chassis 26, a first rear axle 28, a second rear axle 30, a right rear suspension member 32, and a left rear suspension member 34. The trailer chassis 26 is a frame that spans the length of the trailer assembly 14 and provides a structure for mounting other components of the trailer assembly 14 thereon. The left rear suspension member 34 is pivotably mounted to the trailer chassis 26 by a pin 38 such that the left rear suspension member 34 can rotate about the pin 38 in the general direction of arrows 39 and 41 shown in FIG. 1. In a similar manner, the right rear suspension member 32 is pivotably mounted to the trailer chassis 26 by a pin 36, as shown in FIG. 2, such that the right rear suspension member 32 can rotate about the pin 36 in the general direction of arrows 39 and 41 shown in FIG. 1. One end of first rear axle 28 is operatively coupled to the front end of the right rear suspension member 32 by an elastomeric spring (not shown) and the other end of the first rear axle 28 is operatively coupled to the front end of the left rear suspension member 34 by an elastomeric spring (not shown). Similarly, One end of second rear axle 30 is operatively coupled to the rear end of the right rear suspension member 32 by an elastomeric spring (not shown) and the other end of the second rear axle 30 is operatively coupled to the rear end of the left rear suspension member 34 by an elastomeric spring (not shown). A large all terrain wheel 40 is mounted on each end of the first rear axle 28 and the second rear axle 30.

The pivoting action of the right rear suspension member 32 and the left rear suspension member 34, combined with the elastomeric springs, allows each of the four wheels 40 of the trailer assembly 14 to remain in contact with the ground on uneven terrain. Furthermore, the twisting motion of the cab assembly 12 with respect to the trailer assembly 14 at the hitch 16 allows the two wheels 40 of the cab assembly 12 to also remain in contact with the ground independently of the four wheels 40 mounted on the trailer assembly 14. Maintaining all six of the wheels 40 in constant contact with the ground improves the traction and floatation of the articulated work machine 10. Traction is the ability of the wheels to move the articulated work machine 10 forward whereas floatation is the ability of the wheels to resist sinking into mud or other soft ground.

The trailer assembly 14 further includes a receptacle 56 adapted to receive and carry loads. In construction and mining operations the most common loads are rock, dirt, gravel, ore, and other similar material. The articulated work machine 10 shown in FIGS. 1 and 2 is configured to carry such heavy loads. However, alternate load receptacles 56 have been configured for use with the articulated work machine 10. The receptacle 56 can be configured for high capacity loads such as waste and other low density materials. The receptacle 56 can further be configured as a flatbed for receiving and hauling large bulky loads. The receptacle 56 can still further be configured as a container carrier to receive and haul a load such as standard cargo containers used on ships and trains. The receptacle 56 can yet further be configured as a water container to transport water to mining and construction sites. The receptacle 56 can still further be configured to receive and carry sugar cane during the harvest of the sugar cane crop.

The trailer assembly 14 further includes an engine assembly 60. The engine assembly 60 is mounted on the trailer chassis 26 in front of the load receptacle 56. The engine assembly 60 includes an exhaust stack 62 mounted on the trailer chassis 26 in front of the receptacle 56 for routing exhaust gases up and away from the articulated work machine 10. It should be appreciated that exhaust gases from the engine assembly 60 could be routed through the receptacle 56 in order to provide heat to the receptacle 56. In such a configuration, the exhaust stack 62 would be mounted to the receptacle 56. It should further be appreciated that mounting the engine assembly 60 in such a manner places the engine assembly 60 between the wheels 40 attached to the front axle 44 and the wheels 40 attached to the first rear axle 28. It should further be appreciated that mounting the engine assembly 10 in such a manner places the engine assembly 60 between the wheel 40 attached to the front axle 44 and the receptacle 56.

Several advantages are realized by mounting the engine assembly 60 on the trailer assembly 14 in the above described manner. A greater portion of the weight of the engine assembly 60 is supported by first rear axle 28 and the second rear axle 30 as compared to articulated work machines 10 that mount the engine assembly 60 on the cab assembly 12. This reduces the weight supported by the front axle 44 when the receptacle 56 is either empty or partially loaded thereby allowing the articulated work machine 10 to be operated on roads in countries which have restrictions on the amount of weight carried by each axle.

Another advantage of mounting the engine assembly 60 on the trailer assembly 14 is that the length of the cab assembly 12 in front of the front axle 44 is reduced. By reducing the length of the cab assembly 12, the articulated work machine 10 becomes more maneuverable, which can be an advantage in many construction and mining operations.

Yet another advantage of mounting the engine assembly 10 on the trailer assembly 14 is that the operator in the cab 50 is better isolated from the heat, noise, and vibration generated by the engine assembly 60 and exhaust stack 62 during operation of the articulated work machine 10. In particular, an articulated work machine 10 having an engine assembly mounted on the cab assembly places the operator in close proximity to the engine assembly and consequently the heat, noise, and vibrations may cause discomfort to the operator. Moreover, in some markets the cab 50 is typically not air conditioned and mounting the engine assembly 60 on the trailer assembly 14 may increase the comfort of the operator.

The engine assembly 60 further includes a engine 64 and a transmission 66. In the exemplary embodiment, the engine 64 is a diesel engine. Diesel engines have several advantages including high torque output, reliability, and low fuel cost. However, it should be appreciated that the engine 64 could alternatively be a gasoline or multifuel engine. The engine 64 generates mechanical energy which is transferred to the transmission 66 by a crankshaft (not shown).

The transmission 66 splits the power output of the crankshaft between a front drive shaft 68, a first rear drive shaft 70, and second rear drive shaft 72. Each of the drive shafts drives an axle of the articulated work machine 10. In particular, the first rear drive shaft 70 drives the first rear axle 28. More specifically, the first rear drive shaft 70 is coupled to a limited slip differential 74 which in turn supplies power to the first rear axle 28. The limited slip differential 74 maximizes the traction of each of the wheels 40 attached to the first rear axle 28. In a similar manner, the second rear drive shaft 72 drives the second rear axle 30. More specifically, the second rear drive shaft 72 is coupled to a limited slip differential 75 which in turn supplies power to the second rear axle 30. The limited slip differential 75 maximizes the traction of each of the wheels 40 attached to the second rear axle 30.

In a manner similar to the first rear drive shaft 70 and the second rear drive shaft 72, the front drive shaft 68 drives the front axle 44. More specifically, the front drive shaft 68 is coupled to a limited slip differential 77 which in turn supplies power to the front axle 44. The limited slip differential 77 maximizes the traction of each of the wheels 40 attached to the front axle 44.

The front drive shaft 68 includes a universal joint 69 located near the hitch 16. The universal joint 69 allows the drive shaft to transmit power from the trailer assembly 14 to the cab assembly 12 as the cab assembly 12 is rotated about the trailer assembly 14 in the general directions of arrows 18 and 20 shown in FIG. 2. It should be appreciated that universal joint 69 and the drive shaft that crosses the hitch 16, namely the front drive shaft 68, are much smaller, and thus less costly, than a similar universal joint and drive shaft used in articulated work machines that have the engine assembly mounted on the cab assembly. In particular, an articulated work machine with an engine assembly mounted on the trailer assembly needs only to transfer enough power from the trailer assembly to cab assembly to drive the two front wheels whereas an articulated work machine with an engine assembly mounted on the cab assembly needs to transfer enough power from the cab assembly to the trailer assembly to drive the four rear wheels.

Moreover, the transmission 66 allows the operator to selectively change the gear ratios between the crankshaft and the front drive shaft 68, a first rear drive shaft 70, and second rear drive shaft 72. The change of ratios allows the articulated work machine to provide torque to the wheels 40 over a broad range of operating conditions. In particular, high torque may be required at low speeds whereas low torque may be required at high speeds. In addition, the transmission 66 includes an interaxle differential (not shown) that adjusts the amount of torque split between the front drive shaft 68, the first rear drive shaft 70 and the second rear drive shaft 72 in order to maximize the traction of the six wheels 40.

The engine assembly 60 further includes a hydraulic pump 80, a steering hose assembly 82, and a lift hose assembly 84. The hydraulic pump 80 uses mechanical energy from the engine 64 to raise hydraulic oil to an operational pressure. The operational pressure is supplied to a right steering cylinder 86 and a left steering cylinder 88 by the steering hose assembly 82, shown in FIG. 1. One end of the right steering cylinder 86 is mounted to right side of the trailer chassis 26 and the other end is mounted to the right side of the cab chassis 42 such that applying the operational pressure to the right steering cylinder 86 causes the cab assembly 12 to rotate in the general direction of arrow 18 so as to turn the articulated work machine to the left. In a similar manner, one end of the left steering cylinder 88 is mounted to left side of the trailer chassis 26 and the other end is mounted to the left side of the cab chassis 42 such that applying the operational pressure to the left steering cylinder 88 causes the cab assembly 12 to rotate in the general direction of arrow 20 so as to turn the articulated work machine to the right.

The operational pressure is also supplied is supplied to a pair of lift cylinders 90 by the lift hose assembly 84. One end of each of the lift cylinders 90 is mounted to the right and left side of the trailer chassis 26 respectively whereas the other end of each lift cylinder 90 is mounted to the right and left side of the receptacle 56. As operational pressure is supplied to the lift cylinders 90 respectively, the lift cylinders 90 extends in the general direction of arrow 94 shown in FIG. 1 so as to urge the receptacle 56 in the general direction of arrow 94. In particular, the receptacle includes a hinge joint 92 that allows the receptacle 56 to rotate about the hinge joint 92 so as to move the receptacle 56 relative to the trailer chassis 26 in the general direction of arrows 39 and 41 in order to dump loads from the receptacle 56. When the operational pressure is removed from the lift cylinders 90, the cylinders will retract in the general direction of arrow 96, and the weight of the receptacle 56 will cause the rotation of the receptacle 56 in the general direction of arrow 39 thereby returning the receptacle 56 to the position as shown in FIG. 1. It should be appreciated that the lift hose assembly 84 lies entirely between the hitch 16 and the wheels 40 of the first rear axle 28 allowing the lift hose assembly 84 to power the lift cylinders 90 without the need to route the lift hose assembly 84 between the trailer assembly 14 and the cab assembly 12.

INDUSTRIAL APPLICABILITY

Mounting the engine assembly 60 on the trailer assembly 14 more proportionately distributes the weight of engine assembly among the axles of the articulated work machine. Furthermore, mounting the engine assembly 60 on the trailer assembly 14 better isolates the operator in the cab 50 from the heat, noise, and vibration generated by the engine assembly 60 and exhaust stack 62 during operation of the articulated work machine 10. Note that, the engine assembly 60 creates heat, noise and vibrations as it provides the motive power to propel the articulated work machine 10.

The power output from the engine 62 of the engine assembly 60 is supplied to the transmission 66. The transmission 66 splits the power between the front drive shaft 68, the first rear drive shaft 70 and the second rear drive shaft 72. By mounting the engine assembly 10 on the trailer assembly 14, only the two wheels 40 of the front axle 44 must be driven by a drive shaft that spans between the trailer assembly 14 and the cab assembly 12. Each drive shaft 68, 70, 72 includes a limited slip differential 74, 75, 77 respectively which applies power to a pair of wheels 40 thereby providing the articulated work machine 10 enhanced 0 traction.

The pivoting action of the right rear suspension member 32 and the left rear suspension member 34 together with the twisting motion of the cab assembly 12 with respect to the trailer assembly 14 at the hitch 16 allows each the six wheels 40 of the articulated work machine 10 to remain in contact with the ground. Maintaining all six wheels in contact with the ground provides floatation thereby preventing the wheels 40 of the articulated work machine 10 from sinking into mud or other soft ground.

In order to steer the articulated work machine 10, the engine assembly 60 further powers a hydraulic pump 80. The operational pressure generated by the hydraulic pump 80 is supplied to the right steering cylinder 86 to turn the articulated truck to the left direction. Similarly, operational pressure generated by the hydraulic pump 80 is supplied is supplied to the left steering cylinder 88 to turn the articulated truck to the right direction.

In order to dump loads from the receptacle 56, the operational pressure generated by the hydraulic pump 80 is also supplied is supplied to a pair of lift cylinders 90 by the lift hose assembly 84. As operational pressure is supplied to the lift cylinders 90, the cylinders 90 cause the receptacle 56 to pivot relative to the trailer chassis 26 in the general direction of arrow 41. In order to return the receptacle 56 to its load carrying position, the operational pressure generated by the hydraulic pump 80 is removed from the pair of lift cylinders 90. Mounting the engine assembly 60 on the trailer assembly 14 removes the need to route lift hose assembly 84 between the trailer assembly 14 and the cab assembly 12.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. An articulated work machine, comprising:

a cab assembly having (i) a front axle assembly on which a number of front wheels are mounted, and (ii) a seat for supporting an operator of said work machine;

a trailer assembly having a rear axle assembly on which a number of rear wheels are mounted;

a receptacle adapted to receive and carry loads, said receptacle being supported on said trailer assembly;

a coupling which pivotally connects said cab assembly to said trailer assembly;

an engine assembly for propelling said work machine, wherein (1) said engine assembly is mounted on said trailer assembly, and (2) said engine assembly is interposed between said receptacle and said number of front wheels; and a hydraulic cylinder which is used to raise and lower said receptacle relative to said trailer assembly.

2. The work machine of claim 1, wherein said engine assembly includes a hydraulic pump, further comprising:

a hose assembly which places said hydraulic pump in fluid communication with said hydraulic cylinder, wherein said hose assembly is entirely interposed between said coupling and said number of rear wheels.

3. The work machine of claim 1, further comprising a front axle drive shaft, wherein:

said front axle drive shaft extends from said engine assembly to said front axle assembly, and said front axle drive shaft extends from said trailer assembly to said cab assembly.

4. The work machine of claim 1, wherein said engine assembly is interposed between said number of front wheels and said number of rear wheels.

5. The work machine of claim 1, further comprising an exhaust system, wherein:

said exhaust system is operatively coupled to said engine assembly, and said exhaust system is interposed between said coupling and said number of rear wheels.

6. An articulated work machine, comprising:

a cab assembly having (i) only a single front axle on which a number of front wheels are mounted, and (ii) a seat for supporting an operator of said work machine;

a trailer assembly having a rear axle assembly on which a number of rear wheels are mounted;

a coupling which pivotally connects said cab assembly to said trailer assembly; and an engine assembly for propelling said work machine, wherein (1) said engine assembly is mounted on said trailer assembly, and (2) said engine assembly is interposed between said number of front wheels and said number of rear wheels.

7. The work machine of claim 6 further includes a hydraulic pump, a receptacle supported on said trailer assembly, a hydraulic cylinder operative to raise and lower said receptacle relative to said trailer assembly, and a hose assembly which places said hydraulic pump in fluid communication with said hydraulic cylinder, wherein said hose assembly is entirely interposed between said coupling and said number of rear wheels.

8. The work machine of claim 6, further comprising a front axle drive shaft, wherein:
said front axle drive shaft extends from said engine assembly to said single front axle, and
said front axle drive shaft extends from said trailer assembly to said cab assembly.

9. An articulated work machine, comprising:
a cab assembly having a seat for supporting an operator of said work machine and a front axle assembly on which a number of front wheels are mounted;
a trailer assembly;
a receptacle being supported on said trailer assembly;
an engine assembly for propelling said work machine, wherein said engine assembly is mounted on said trailer assembly and is interposed between said receptacle and said front wheels; and
a hydraulic cylinder which is used to move at least a part of said receptacle relative to said trailer assembly so that material located within said receptacle is removed therefrom.

10. The work machine of claim 6, further comprising an exhaust system, wherein:
said exhaust system is operatively coupled to said engine assembly, and
said exhaust system is interposed between said coupling and said number of rear wheels.

11. An articulated work machine, comprising:
a cab assembly having (i) only a single front axle on which a number of front wheels are mounted, and (ii) a seat for supporting an operator of said work machine;
a trailer assembly having (i) a first rear axle assembly on which a number of first rear wheels are mounted, and (ii) a second rear axle assembly on which a number of second rear wheels are mounted;
a receptacle adapted to receive and carry loads, said receptacle being supported on said trailer assembly;
a coupling which pivotally connects said cab assembly to said trailer assembly; and
an engine assembly for propelling said work machine, wherein (1) said engine assembly is mounted on said trailer assembly, (2) said engine assembly is interposed between said receptacle and said number of front wheels, and (3) said engine assembly is interposed between said number of front wheels and said number of second rear wheels.

12. The work machine of claim 11, wherein said engine assembly includes a hydraulic pump, further comprising:
a hydraulic cylinder which is used to raise and lower said receptacle relative to said trailer assembly; and
a hose assembly which places said hydraulic pump in fluid communication with said hydraulic cylinder, wherein said hose assembly is entirely interposed between said coupling and said number of second rear wheels.

13. The work machine of claim 11, further comprising a front axle drive shaft, wherein:
said front axle drive shaft extends from said engine assembly to said single front axle, and
said front axle drive shaft extends from said trailer assembly to said cab assembly.

14. The work machine of claim 11, further comprising an exhaust system, wherein:
said exhaust system is operatively coupled to said engine assembly, and
said exhaust system is interposed between said coupling and said number of second rear wheels.

15. The articulated work machine of claim 1, wherein said front axle assembly includes only a single front axle on which said number of front wheels are mounted.

* * * * *